Dec. 30, 1969       JAMES E. WEBB       3,487,216
ADMINISTRATOR OF THE NATIONAL AERONAUTICS
AND SPACE ADMINISTRATION
CAVITY RADIOMETER
Filed Aug. 14, 1967       2 Sheets-Sheet 1
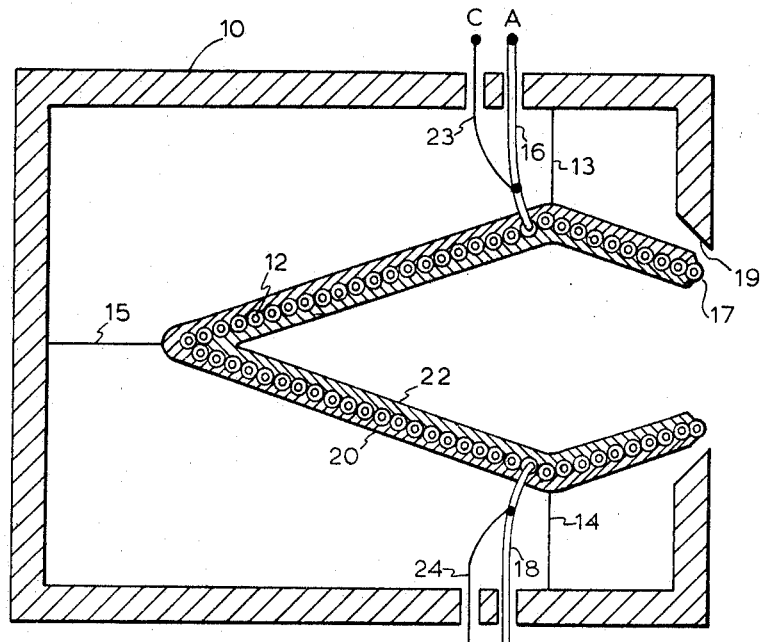
FIG. 1
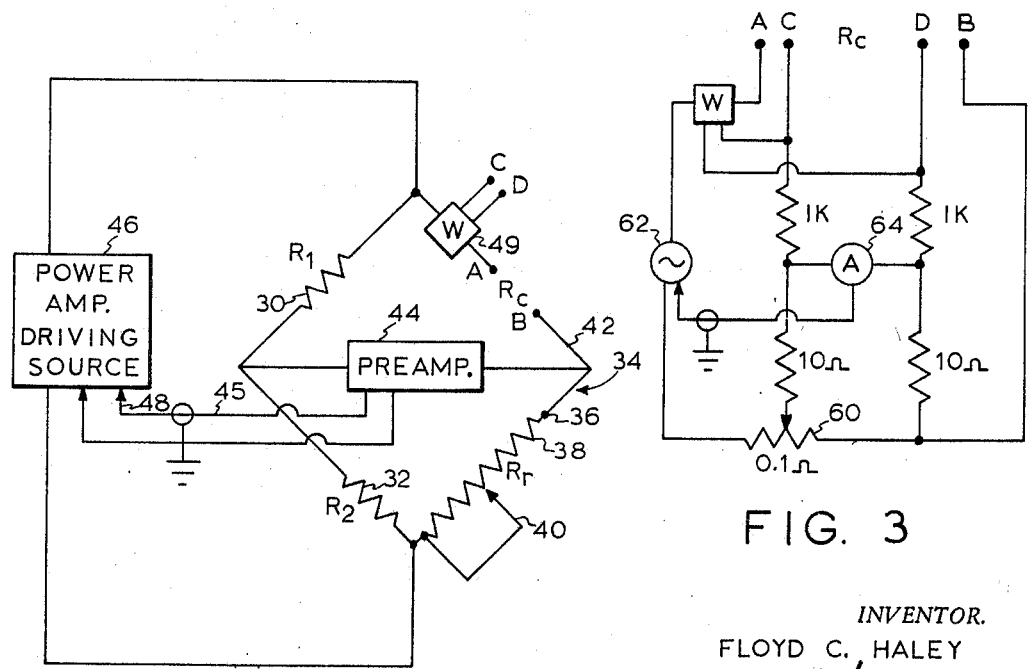
FIG. 2
FIG. 3
INVENTOR.
FLOYD C. HALEY
BY
ATTORNEYS Dec. 30, 1969  JAMES E. WEBB  3,487,216
ADMINISTRATOR OF THE NATIONAL AERONAUTICS
AND SPACE ADMINISTRATION
CAVITY RADIOMETER
Filed Aug. 14, 1967  2 Sheets-Sheet 2
FIG. 4
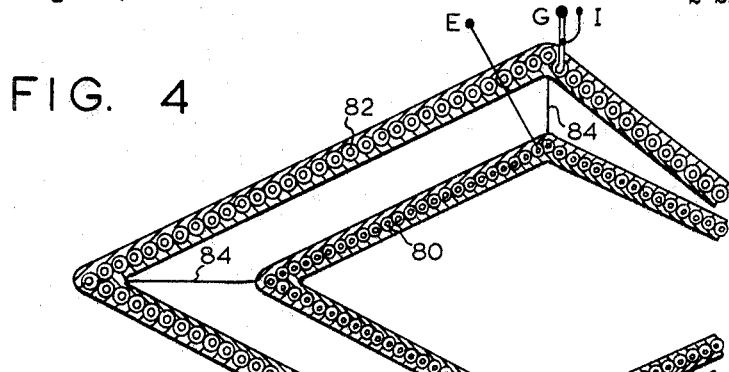
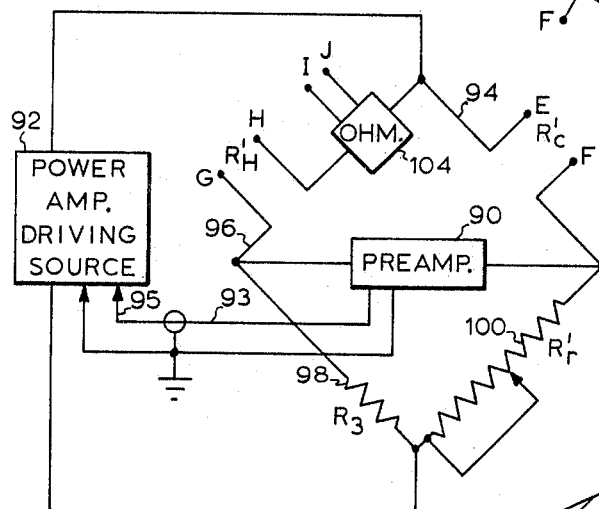
FIG. 5
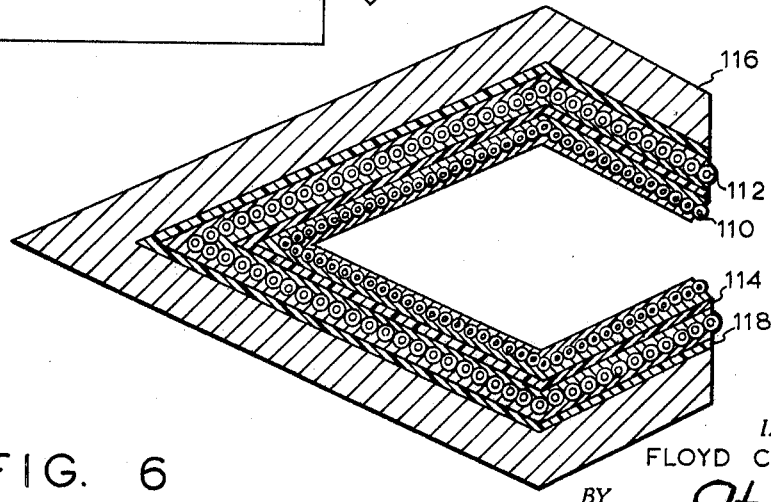
FIG. 6
INVENTOR.
FLOYD C. HALEY
BY
ATTORNEYS

United States Patent Office 3,487,216
Patented Dec. 30, 1969

3,487,216
CAVITY RADIOMETER
James E. Webb, Administrator of the National Aeronautics and Space Administration, with respect to an invention of Floyd C. Haley, La Canada, Calif.
Filed Aug. 14, 1967, Ser. No. 661,170
Int. Cl. H01j 35/00, 37/00, 39/12
U.S. Cl. 250—84                    15 Claims

ABSTRACT OF THE DISCLOSURE

A black body cavity radiometer wherein the black body cavity is a thin shell formed of a thermally sensitive resistance wire to obtain rapid response. The resistance of the cone, which indicates its temperature, is measured by a bridge, and the unbalance of the bridge is highly amplified and used to drive the bridge (including the arm containing the cone). Accordingly, large currents flow through the cone until the bridge is balanced and response is very rapid.

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

Field of the invention

This invention relates to radiation measuring instruments and more particularly to an improved radiation measuring and generating instrument.

Description of the prior art

Accurate radiation measurements have generally been made by instruments which compare the radiation from a reference source with the radiation from an unknown source to be measured. Errors and inconvenience arise both because of deficiencies in the source and deficiencies in the measuring instrument. Where the reference source is a tungsten filament or other easily varied source, errors may arise from changes in the source by aging or other causes. In many applications, a black body source such as a heated cavity with a hole through which radiation emerges can be used, which is self-calibrating, but it has generally proved difficult to rapidly vary the temperature of the cavity.

Radiation measuring instruments which only occasionally are calibrated against a reference source and which merely measure the heat absorbed from an unknown source are subject to errors. Such errors arise from changes in the instrument between calibrations, the fact that the detector sensitivity is not constant over a wide range of wavelengths of radiation such as between extreme ultraviolet and extreme infrared, and the fact that it is difficult to calibrate and maintain calibration at many wavelengths.

SUMMARY OF THE INVENTION

One object of the present invention is to provide a device which can be used either as a self-calibrating radiation detector or as a radiation standard, which has unit absorption and radiation over an extremely wide range of wavelengths, and which rapidly adjusts to any temperature within its range to detect or emit radiation.

Another object of the invention is to provide a radiation detection and source apparatus utilizing an element raised to the temperature of the source to be detected or an independently determined temperature, wherein the same current which measures the resistance and therefore the temperature of a detection/radiation element is used to heat and maintain the temperature of the element.

Yet another object of the invention is to provide a cavity radiation instrument capable of rapid change of temperature.

The foregoing and other objects are realized by a radiation instrument comprising a novel black body cavity and a novel circuit for controlling the temperature of the cavity. The black body cavity comprises a cone-shaped shell suspended in a thermal isolation housing, the housing having a hole in it so that radiation can pass into and out of the shell. The shell or cone is constructed of fine insulated resistance wire, wound as a single layer into a cone shape and suspended within the housing by quartz fibers which insulate the conical shell from the walls of the housing.

The outer surface of the cone has a silver covering to minimize heat transfer between its walls and the walls of the housing and to conduct heat between windings of the cone to help maintain a constant temperature over the entire cone. The inner surface of the cone is covered with a thin platinum black coating to readily absorb radiation and to also conduct heat between turns of wire of the cone and therefore help maintain a constant temperature over the entire cone. The ends of the wire comprising the cone can be connected to a current source to cause heating currents to flow through the cone and raise its temperature. Because of the very small mass of the cone and the fact that the heating element is so close to and essentially a part of the black absorbing surface, the temperature of the cone and its black inner surface can be altered very rapidly.

The ends of the wire of which the cone-shaped shell is constructed are connected to a bridge-type circuit which measures the resistance of the cone to determine its temperature. In accordance with this invention, the bridge-type circuit also delivers the amount of current required to maintain a desired cone temperature. One arm of the bridge is an accurate rheostat and another arm of the bridge is the wire cone. A condition close to balance of the bridge is obtained when the cone is raised to a temperature where its resistance (which varies greatly with temperature) reaches a certain value which satisfies the condition of balance as determined by the setting of the rheostat.

The unbalance of the bridge, one arm of which contains the cone, is sensed by a high gain preamplifier whose output is connected to a power amplifier used to drive the bridge. Thus, so long as the wire cone has not reached a resistance (and therefore a temperature) sufficient to balance the bridge, large driving currents flow through the wire cone to cause it to rapidly achieve the desired temperature. When the desired temperature of the cone is reached, very little bridge unbalance will exist and the driving currents will be sufficient only to maintain that temperature. The amplifiers are of sufficiently high gain that only an insignificant unbalance is sufficient to produce bridge driving currents that maintain the cone temperature.

A better understanding of the invention will be had by the following detailed description and claims and the accompanying drawings.

BRIEF DESCRIPTION OF THE DRAWINGS

FIGURE 1 is a sectional view of a black body cavity constructed in accordance with the invention;

FIGURE 2 is a simplified schematic diagram of a bridge detector having terminals A, B, C and D which may be connected to corresponding terminals of the cavity of FIGURE 1;

FIGURE 3 is a schematic diagram of another embodiment of a bridge detector having terminals A, B, C and D which may be connected to corresponding terminals of the cavity of FIGURE 1;

FIGURE 4 is a sectional view of another embodiment of a black body cavity constructed in accordance with the invention;

FIGURE 5 is a schematic diagram of another embodiment of a bridge circuit having terminals E, F, G, H, I and J for connection to corresponding terminals of the black body cavity of FIGURE 4; and FIGURE 6 is a sectional view of still another embodiment of a back body cavity constructed in accordance with the invention.

DESCRIPTION OF THE PREFERRED EMBODIMENTS

The black body cavity shown in FIGURE 1 comprises a housing 10 having thick walls of heat conductive material to facilitate the maintenance of a constant predetermined temperature, such as a room temperature of 70° F. A double cone 12 constructed of closely wound fine resistance wire is suspended within the housing by five quartz fibers, only three of which 13, 14 and 15 are shown. The resistance wire is of the type which has an appreciable change of resistance with temperature and such materials as platinum, nickel, tungsten and copper can generally be used.

The winding of the cone is of a bifilar type, that is, it comprises two parallel wires wound side-by-side, the wires being constructed to carry currents in opposite directions so that the magnetic fields about the wires cancel out and the cone has a negligible inductance. The cone is of shell-like configuration for providing a thin member of large area and is of biconical shape with one end 17 truncated and aligned with an opening 19 in the housing. The ends 16 and 18 of the resistance wire pass through small apertures in the housing and provide terminals A and B for conducting currents through the wire cone. Two tap wires 23 and 24 connected to the resistance wire ends 16 and 18 near the wire cone, provide terminals C and D for sensing voltage across the cone. Separate tap wires are used because the wire ends 16 and 18 carry large currents and a substantial voltage drop can occur between either terminal A or B and the cone.

It is desirable to have the cone as uniformly heated as possible because hot spots would cause spectral impurity and therefore errors. The maintenance of uniform temperature is aided by encasing the wire cone in a highly heat conductive material. The outside surface 20 of the wire cone is coated with metallic silver which is highly heat conductive, and which also reflects radiation to thermally isolate the cone from the housing 10. The inner surface 22 of the cone has a coating of electrolytically deposited platinum black which is highly heat conductive to promote a uniform inner surface temperature of the cone, and which is black to readily absorb radiation. While other commercially available black coatings may have slightly higher radiation absorption qualities, platinum black has a very high thermal conductivity and therefore is superior in this respect.

The platinum black coating 22 is thin so that heat is readily transferred to the resistive wire and the device has a fast response. However, too thin a coating reduces the ability to maintain constant temperature by means of heat conduction through the platinum black and adds to the mass to be heated so that response is slower; accordingly, the thickness is a design consideration dictated by the specific applications. The silver coating 20 on the outside of the wire cone should be thick enough to promote temperature uniformity but thin enough so that it does not add a great deal of mass which must be heated, the particular thickness again being a design consideration. The coatings in the drawings are shown greatly exaggerated in thickness for clarity of description.

The cavity of FIGURE 1 may be connected to a novel bridge circuit of the Wheatstone type shown in FIGURE 2, to enable the measurement of radiation or to employ the cavity as a radiation source. The cavity is connected to the bridge by connecting terminals A, B, C and D of the cavity of FIGURE 1 to the terminals A, B, C and D of the circuit of FIGURE 2. The bridge has a first arm 30 of resistance $R_1$, a second arm 32 of resistance $R_2$, a third arm 34 having a variable resistance equal to the resistance between one end 36 of a rheostat 38 and a wiper 40, and a fourth arm 42 consisting of the wire cone and having a resistance $R_c$ which is the resistance between terminals A and B of the cone. Balance of the bridge is achieved when the resistance $R_c$ between points A and B is equal to the resistance ratio $R_1/R_2$ multiplied by the resistance $R_r$ of the rheostat 38 between its wiper 40 and the end 36. Any unbalance will result in the flow of current through preamplifier 44, at at least the occurrence of a potential thereacross.

Current to drive the bridge is obtained from power amplifier driving source 46. The voltage delivered by the source 46 is determined by the input 48 derived from the preamplifier 44. The preamplifier 44 amplifies the unbalance currents of the bridge and delivers them over line 45 to the power amplifier 46 which is the driving source of the bridge, to increase the voltage of the driving source when the unbalance of the bridge is increased. It should be noted that for giving resistances of the arms of the bridge, the attainment of balance is theoretically independent of the amount of current flowing through the bridge.

In the bridge of FIGURE 2, a constant proportion of the driving current flows between terminals A and B and therefore through the wire cone, so that the heating of the cone depends upon the voltage of the bridge driving source 46. Since the wire of the wire cone has a resistance which increases with temperature with a high coefficient, the greater the driving voltage from source 46, the higher the temperature of the wire cone and the greater its resistance $R_c$. The heat created by currents through the wire cone is radiated through its opening 17. It may be noted that the resistances $R_1$ and $R_2$ are substantially larger than $R_c$ and $R_r$ so that most of the driving currents flow through the wire cone resistance $R_c$.

In order to bring the wire cone to a predetermined temperature, the wiper 40 of the rheostat 38 is set so that the resistance $R_r$ multiplied by $R_1/R_2$ is equal to the resistance $R_c$ of the wire cone when it reaches that predetermined temperature. The relationship between resistance $R_c$ and temperature of the wire cone is easily determined by calculations involving the resistance per unit length of the resistance wire of the cone and the length of wire therein, or measurements may be taken to calibrate it, only one set of calibration being required during the life of the cavity because the resistance changes very little with age and use.

Before the wire cone reaches a temperature at which its resistance $R_c$ equals the resistance $R_r$ set on the rheostat multiplied by $R_1/R_2$, there will be a considerable unbalance in the bridge and a considerable voltage will appear across the inputs of the amplifier 44. The amplifier output 45 will then be very large and the voltage across driving source 46 will be very large. As a result, large currents will flow through points A and B and through the wire cone, increasing its temperature and its resistance.

When the cone reaches a temperature at which the resistance $R_c$ of the cone is equal to the resistance $R_r \times R_1/R_2$, no voltage will appear across the amplifier 44 and the voltage delivered by driving source 46 will be relatively small. Actually, since appreciable current must flow through the wire cone to maintain its temperature and resistance, and driving source 46 generally does not deliver sufficient current to do this when there is no input at 48, a steady state condition will generally be achieved when a very small unbalance of the bridge occurs. The unbalance will be just that amount required for the amplifier output to increase the voltage of the driving source 46 to the level where just enough current flows through the wire coil to maintain the desired temperature. The preamplifier 44 has a very large gain so that the unbalance required to attain steady state conditions is very small and the resistance $R_c$ essentially equals the resistance $R_r$ multiplied by $R_1/R_2$.

It should be noted that when the resistance, or temperature of the cone is higher than is required for balance, the system is degenerative and the direction of the unbalance results in the preamplifier output driving the power amplifier 46 to nearly zero output.

In order to determine the total amount of power being dissipated by the wire cone, all that need be done is to measure the amount of power being delivered to the cone. This can be accomplished with the wattmeter 49 which is connected to the bridge of FIGURE 3 with its current connections in series with the arm 42 and its voltage input between points C and D.

Thus, the black body cavity controls its own power to drive itself to a resistance and therefore a temperature value determined by the other arms of the bridge. When the cavity approaches this temperature, the bridge approaches balance, the error signal approaches zero, and the power flowing through the wire coil is throttled to a value just sufficient to maintain the cone at the set temperature. It should be noted that in this arrangement, no thermal lag exists between the means for heating the cavity and the means for sensing the temperature of the cavity since they are identical. For this reason, a preamplifier 44 and power amplifier 46 of very large gains may be used without creating instability, and the desired temperature is reached very quickly.

It may also be noted that unlike conventional resistance thermometry practices, where the power delivered to the thermometer must be reduced as much as possible to prevent it from becoming hotter than the object whose temperature is being measured, in the present invention the thermometer is itself the device whose temperature is being controlled and monitored. Accordingly, appreciable currents can flow through the thermometer device, thereby making measurements easier.

The cavity can be used either as a source of radiation or as a radiation measuring instrument. To use the cavity radiometer as a black body radiation source, the rheostat 38 in FIGURE 2 is set so that a particular desired temperature of the wire cone must be achieved for bridge balance, there being a known relationship between the temperature and resistance of the wire cone. The wire cone will then increase in temperature until the desired temperature is reached, in the manner described above. Since the temperature of the cavity shell is accurately controlled and the area of its opening may be accurately measured, the amount of black body radiation emitting from it may be relatively accurately calculated from the well known black body radiation laws. An independent determination also may be made, by first placing an object over the opening of the cavity but not in physical contact thereon, the temperature of the object being held at exactly that of the cone shell. Under these conditions the net radiant energy entering and leaving the cavity will be zero and the wattmeter will indicate only that amount of energy lost through other paths such as by conduction and convection. Upon removal of the object the increase in the wattmeter reading will be an accurate measure of the radiant energy being emitted by the cavity.

The cavity radiometer can be used as a radiation measuring instrument to measure radiation emitted by another source. Two types of energy measurements can be made, one measurement being that of the total energy emitted by a large surface which is the only object viewed by the radiometer, and the other being a measurement of the radiation from an object, such as a lamp, which is in the presence of a large background of radiation. Both of these measurements will be described.

A measurement of the total energy emitted by a large surface can be made by first directing the opening 19 of the radiometer at a very cold surface so that negligible radiation is being emitted by that surface. In most applications, a surface cooled by liquid nitrogen is acceptable. An appreciable wattage is delivered to the cone by setting its temperature (by adjusting rheostat 38) so that a maximum permissible reading is obtained on the wattmeter. It is not necessary that the actual temperature of the cone be known but it is necessary that the wattage or power to the cone be accurately measured as by a wattmeter connected as described above. Then the surface of unknown radiation to be measured is placed in front of the cavity opening 19 so that it is viewed. The temperature of the cone is maintained at the same level but less wattage will now flow though the wire cone because some of the heat originally supplied electrically is now obtained radiometrically from the unknown surface. By measuring the decrease in wattage to the wire cone while its temperature is maintained constant (the temperautre is kept constant if the rheostat is not moved), the energy being radiated by the unknown surface to the unit area black body is known, this energy being equal to the decrease in wattmeter reading. This indicates the amount of radiation emanating from the unknown surface.

The second type of measurement, the determination of the energy emitted from a small radiant object which is in a radiant background, can be made with the same apparatus. The measurement of radiation from the radiant object is made by first directing the cavity radiometer toward the background radiation without the highly radiant object in it. The wattage supplied to the wire cone is adjusted to an appreciable value by setting the cone temperature through an adjustment of the rheostat. With the same rheostat setting, the highly radiant object is placed in the background so that it is viewed by the cavity radiometer in addition to its background. The wattage supplied to the wire cone is then read and the decrease in wattage between the viewing of only the background and the viewing of the radiant object and the background is equal to the radiant energy supplied by the radiant object alone. It may be noted that the temperature of the wire cone remains constant during the foregoing viewings so the decrease in wattage represents the heat supplied by the radiant source which was earlier supplied by electric currents.

The calculations for determining the radiant flux (measured in power per unit area such as watts/cm.$^2$) of unknown sources is determined by dividing the change in wattage to the wire cone, as determined above, by the area of the cavity opening which is the area at cone opening 17. Inasmuch as the cavity opening is a fixed value for a particular detector, the wattmeter used in the bridge circuit may be marked to read directly in watts/cm.$^2$. With such markings, the device is a direct reading photometer. Since electrical wattage and area may be measured with great accuracy, the accuracy of the measurement is limited primarily by the degree to which unit emissivity is achieved, and unit emissivity is very nearly obtained with the geometric shape shown and the materials of construction described above.

While the Wheatstone bridge of FIGURE 2 can be used for driving the cone and measuring its temperature, a Kelvin Ratio bridge, such as that shown in FIGURE 3, generally provides more accurate measurements. The bridge of FIGURE 3 is especially useful where the current-carrying leads, which connect the terminals A and B of the bridge and cone, are so long that their resistance variations contribute to bridge balance variations and may cause errors. The Kelvin Ratio bridge of FIGURE 3 reduces such errors to a minimum because the voltage across the cone is measured by separate leads (connected at C and D) which carry very little current. The values of the resistance components of the circuit shown in FIGURE 3 are typical values which may be used in conjunction with a wire cone having a room temperature resistance of approximately eight ohms.

The devcie of this invention is capable of accurate and very rapid temperature control. While the response time of the wire cone without temperature control may be of the order of several seconds, the response of the cone and bridge circuit can be much more rapid than this. The fast response is due to the fact that the control amplifier can deliver very large currents to very rapidly heat up the cone, even when the difference between actual and desired temperature is very small; similarly, the temperature-maintaining current can be quickly reduced to nearly zero to allow for a rapid decrease in temperature of the cone if its temperature is even slightly greater than the desired temperature. In many situations, the effective response time of the cone may be approximated by dividing the response time of the cone without temperature control (which is of the order of several seconds) by the gain of the control amplifier. Since the amplifier may have a gain of as much as $10^6$ in some designs, effective response times of several microseconds may sometimes be possible.

Cavity radiometers have been constructed and tested in accordance with the above. A wire cone having a resistance varying between one ohm and ten ohms for temperatures between 73° K. and 373° K. has been used together with a bridge circuit having a design shown in the simplified schematic diagram of FIGURE 2. The cavity radiometer terminals A, B, C and D were connected to the terminals marked A, B, C and D in FIGURE 3. The resistances shown in FIGURE 3 were used and the rheostat 60 was a ten-turn wire-wound type having a resistance between ends of 0.1 ohm. In order to reduce the effect of stray currents on the null of the bridge, an alternating current driving source 62 was used to drive the circuit and a tuned amplifier 64 was used to amplify the bridge unbalance. The devices were found to operate in the manner described above.

While the cavity radiometer described above readily measures the energy emitted by an unknown source, measurement of the temperature of an unknown source is more difficult. The temperature of an unknown radiant source could be measured by noting the cone temperature at which no heat is being radiated to or from the source. Such a measurement is difficult to make with the foregoing apparatus because some heat is transmitted to the cavity housing. A cavity and bridge of the type illustrated in FIGURES 4 and 5 provides means for heating the housing to the temperature of the cone, so that there is practically no heat interchange between them. When the cone then faces the radiant source, it may be raised to a temperature at which zero heating current to the cone maintains equilibrium, and the temperature of the cone then equals the temperature of the unknown source.

In the cavity radiometer of FIGURE 4, a cone 80 is employed which is formed from a bifilar winding similar to that of the cone of FIGURE 1. A housing 82, disposed about the cone, is also constructed from a winding of resistance wire, to enable heating of the housing to the same temperature as that of the cone 80. A shield (not shown) surrounds the winding of resistance wire illustrated at 82 to thermally isolate the wire from the surroundings and keep heat loss to a minimum.

The material used in the wire of the housing 82 is the same as that used in the cone 80 to provide for the same temperature coefficient of resistance. However, the wire used in the housing is of much larger diameter than that of the cone, to provide the housing winding with a lower resistance and thereby enable it to carry more current. This arrangement is used because the housing dissipates appreciable heat, which is supplied by electrical currents, while the cone is at the same temperature as its surroundings and requires essentially no heating currents. In a typical arrangement, the housing 82 has a resistance of 10 ohms at room temperature while the cone 80 has a resistance of 300 ohms at room temperature. Even though the housing 82 is to be heated to cone temperature, the cone 80 is thermally isolated from the housing by suspending it therein by quartz fibers 84, to reduce thermal losses to the housing to a minimum.

The cavity radiometer of FIGURE 4 can be operated by the Wheatstone bridge of FIGURE 5, by connecting terminals E, F, G, H, I and J of the radiometer to the same letered terminals of the bridge. The bridge of FIGURE 5 is constructed similarly to the bridge of FIGURES 2 and 3, with the unbalance sensed by preamplifier 90 being amplified in source 92 and used to drive the bridge. (If the unbalance has a polarity indicating that the housing temperature must be decreased, the preamplifier drives the bridge power source to nearly zero.) Both the cone and the housing resistances constitute arms of the bridge, the cone resistance constituting arm 94 with resistance $R_c'$, and the housing constituting arm 96 with resistance $R_H'$. One of the other two arms 98 is a fixed resistor of resistance $R_3$ and the other is a rheostat 100 of resistance $R_r'$.

When using the bridge of FIGURE 5 to measure the temperature of a source, the rheostat 100 is set so that $R_r'/R_3 = R_c'/R_H'$. For example, if $R_c'=300$ ohms, $R_H'=10$ ohms, and $R_3=1$ ohm, then $R_r'$ is set at 30 ohms (the resistances $R_c'$ and $R_H'$ are taken at the same temperature, such as 25° C.). Under these conditions, the bridge is at balance only when the housing 82 and sensor cone 80 have the same ratio of resistances as at room temperature, which occurs only when the housing and sensor cone are at the same temperature. When unbalance occurs because the housing is colder than the sensor cone, appreciable voltage appears at output 93 of the preamplifier 90 and the bridge driving source 92 provides a large output. As a result, large currents flow through arm 96, which contains the housing resistance $R_H'$, and the housing temperature quickly increases. A larger bridge driving voltage causes larger currents to flow through the core resistance $R_c'$, but these currents are very small due to the large cone resistance, and there is very little electrical heating of the cone.

When a radiation source of unknown temperature is viewed by the sensor cone 80, the temperature of the cone rises. This results in a bridge unbalance which causes larger currents to flow through the housing until the housing temperature is practically equal to sensor cone temperature. Cone temperature will continue to rise above that of the housing until the cone temperature equals the temperature of the source, with the housing temperature following close behind. Bridge balance is almost completely reached when the temperatures of the housing, cone, and source are all nearly equal. Measurement of the resistance of the housing, by means of the ohmmeter 104, yields a measurement of the temperature of the housing and therefore of the unknown radiation source.

While the cones described above provide excellent performance in stationary use, they are somewhat fragile because of the suspension of the sensing cone by quartz fibers within the housing. Another arrangement of the invention, illustrated in FIGURE 6, provides greater ruggedness by positioning the cone 110 against the housing winding 112 with a layer of material 114 between them. The layer 114 serves both as an insulation to thermally isolate the cone from the housing winding 112 and as a glue to bond the cone to the housing winding. The housing winding 112 is similarly bonded to an outer shell or shield 116 by an insulating layer 118.

While particular embodiments of the invention have been illustrated and described herein, it should be understood that many modifications and variations may be resorted to by those skilled in the art. For example, a continuous conductive inner shell may be employed instead of a wire wound cone, as the body which faces the unknown radiation source. To reduce inductance to a minimum, the housing can be constructed as a thin metal shell disposed about the inner shell with currents carried in a direction opposite to the current in the inner shell. Accordingly, the scope of the invention is limited only by a just interpretation of the following claims.

I claim:
1. A black body radiation cavity comprising:
   walls defining a housing with an aperture therein;
   a radiation member disposed in said housing, said member constructed of resistance means having a resistance which varies substantially with temperature, and having a shell-like configuration for providing a thin member of large area;
   means for supporting said radiation member within said housing and thermally isolating said radiation member from the outer surface of said housing; and
   electrical conductors connected to said resistance means for carrying electric currents thereto.

2. The black body radiation cavity as defined in claim 1 wherein:
   said resistance means comprises a multiplicity of adjacent windings of resistive wire; and including
   a coating of high heat conducting material disposed on said wire and extending between adjacent turns, whereby to promote uniformity in the surface temperature of said radiation member.

3. The black body radiation cavity as defined in claim 1 wherein:
   said resistance means is cone-shaped and includes multiple adjacent turns of wire having a high coefficient of temperature-resistance variation, said cone-shaped resistance means being oriented with its axis substantially aligned with said aperture in said housing to capture and emit radiation primarily through said housing opening.

4. The black body radiation cavity as defined in claim 3 including:
   a high heat conductive coating disposed on the inner surface of said cone-shaped resistance means and connecting adjacent turns of said wire, said coating having a blackened surface; and
   a coating of high heat conductive material disposed on the outer surface of said radiation member for thermally connecting adjacent turns of wire, said coating on the outer surface having a highly heat reflective surface for thermally isolating said cone from the walls of said housing.

5. The black body cavity as defined in claim 1 including:
   a bridge circuit having at least one arm portion connected to said electrical conductors of said radiation member;
   unbalance detecting means in said bridge circuit for detecting the unbalance thereof;
   bridge driving means in said bridge circuit for generating currents which pass through the arms of said bridge; and
   means connecting said unbalance detecting means and said bridge driving means for causing a greater bridge driving signal when the unbalance of said bridge indicates a lower resistance of said resistance wire means than is required for balance.

6. The black body radiation cavity as defined in claim 5 wherein:
   said unbalance detecting means is a tuned amplifier of high gain and said bridge driving means is a variable voltage oscillator means for delivering a current of the same frequency as the frequency to which said tuned amplifier is tuned, and said bridge driving means has a voltage output which increases and decreases according to the increase and decrease, respectively, of signal values from said tuned amplifier when the resistance of said resistance means is substantially less than is required for the bridge balance.

7. A black body radiation cavity as defined in claim 1 including:
   temperature control means for varying the temperature of at least a portion of said housing to provide it with the same temperature as said radiation member, whereby to enable said radiation member to achieve the same temperature as a radiation field it faces.

8. A black body radiation cavity as defined in claim 7 wherein:
   said resistance means of said radiation member comprises a multi-turn winding of wire forming a cone-like member;
   said housing including a shell of wire of the same material as the material of said resistance means; and including
   bridge means having a first arm containing the resistance of said resistance means, a second arm containing the resistance of said wire of said housing, and a bridge driving source whose voltage is dependent upon bridge unbalance.

9. A black body radiation cavity as defined in claim 1 wherein:
   said means for supporting said radiation member comprises a layer of heat insulating material bonded on one side to said housing and on the other side to said radiation member, whereby to increase ruggedness.

10. Radiation apparatus comprising:
    a radiation source comprising an impedance member having an impedance which varies substantially with temperature, and having a radiation receiving surface for receiving and radiating energy therefrom;
    a bridge;
    means connecting said impedance member to said bridge for constituting said impedance member as at least a portion of an arm of said bridge;
    bridge driving means for electrically driving said bridge; and
    bridge unbalance detecting means connected to said bridge driving means, for detecting the unbalance of said bridge and for causing a change in the output of said bridge driving means when the unbalance of said bridge changes.

11. Radiation apparatus as defined in claim 10 including:
    power measuring means for measuring the electrical power delivered to said impedance member and variable impedance means in an arm of said bridge for establishing the impedance of said impedance member required for at least a near balance of said bridge.

12. Radiation apparatus as defined in claim 10 including:
    a housing disposed about said impedance member and thermally isolated therefrom, said housing having an aperture; and wherein
    said impedance member comprises a wire cone with an impedance which is substantially entirely resistive, having adjacent turns of wire which form a cone-shaped surface opening toward said aperture in said housing.

13. Radiation apparatus as defined in claim 12 including:
    a highly heat conductive coating disposed on the inside of said impedance member for thermally connecting said wire turns, whereby to reduce variations in temperature over the inner surface of said radiation apparatus.

14. A black body cavity comprising:
a housing having an aperture therein;
a cone-shaped radiation receiving element constructed of multiple turns of electrically resistive wire, said element opening toward said aperture in said housing and supported within said housing in heat insulative suspension therewith;
a high heat-conductive coating disposed on the inner surface of said cone, said coating having a blackened inner surface; and
a high heat-conductive coating disposed on the outer surface of said cone-shaped element, said coating on said outer surface of said coating having a high radiation reflective surface.

15. A black body cavity as defined in claim 14 including:
means connected to said resistive wire of said radiation receiving element for delivering a current thereto which is substantially greater than the current required to maintain a constant predetermined temperature of said wire when the resistance of said wire is substantially less than the resistance it has at said predetermined temperature, and for delivering a current thereto which is equal to the current required to maintain said predetermined temperature when said wire is at said predetermined temperature.

References Cited

UNITED STATES PATENTS

| | | | |
|---|---|---|---|
| 3,138,697 | 6/1964 | Banca et al. | 250—84 X |
| 3,309,881 | 3/1967 | Beerman | 250—84 X |
| 3,394,259 | 7/1968 | Brown | 250—85 |

RALPH G. NILSON, Primary Examiner

D. L. WILLIS, Assistant Examiner

U.S. Cl. X.R.

219—347; 250—85